Jan. 17, 1956 N. PENSABENE 2,730,953
ELECTRIC INDUCTION MOTOR-PUMP
Filed Jan. 21, 1952 2 Sheets-Sheet 1
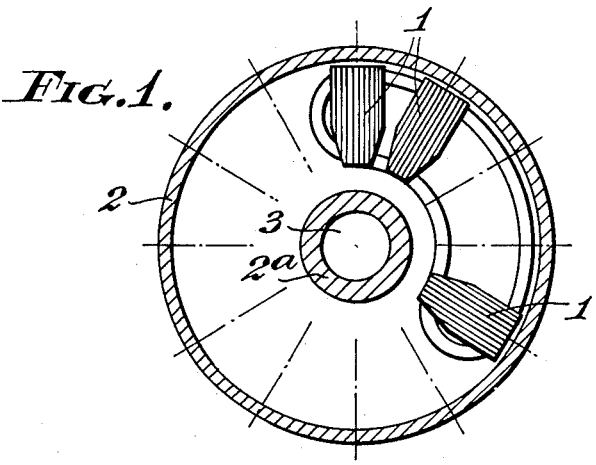
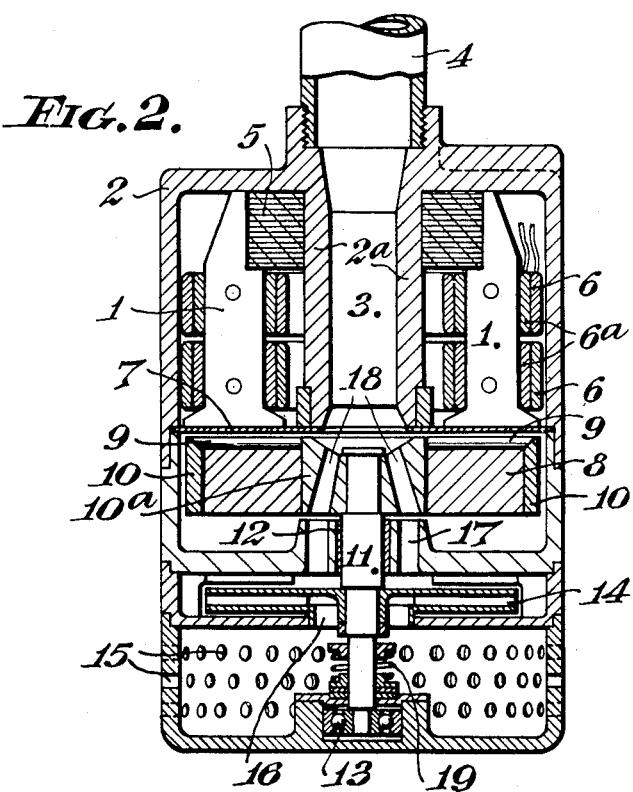
INVENTOR
NICOLO PENSABENE Jan. 17, 1956
N. PENSABENE
2,730,953
ELECTRIC INDUCTION MOTOR-PUMP
Filed Jan. 21, 1952
2 Sheets-Sheet 2
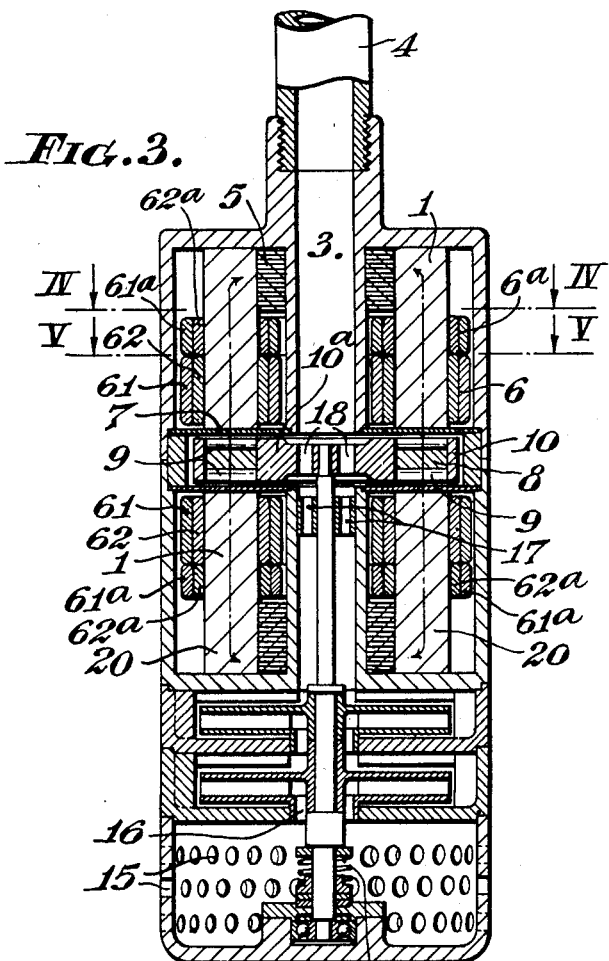
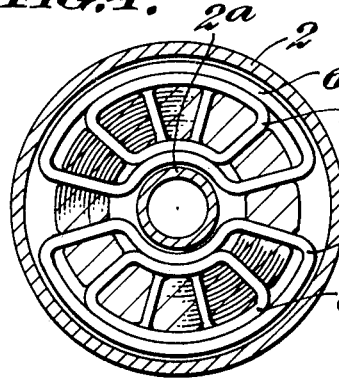
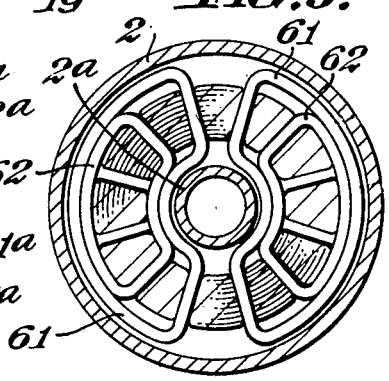
INVENTOR
NICOLO PENSABENE

United States Patent Office 2,730,953
Patented Jan. 17, 1956

2,730,953

ELECTRIC INDUCTION MOTOR-PUMP

Nicoló Pensabene, Orpington, England

Application January 21, 1952, Serial No. 267,330

Claims priority, application Great Britain June 6, 1951

1 Claim. (Cl. 103—87)

This invention relates to electric induction motors, and comprises improvements designed to enable a compact motor of light weight and small diameter to be built with a minimum of material and labour. The invention is particularly applicable to submersible motors of the type having a sealed stator separated from the rotor by a water-tight diaphragm, but the invention is not restricted to motors of this type.

According to the invention, an induction motor comprises a plurality of laminated stator magnet teeth or projections arranged in a ring with their axes parallel to the axis of rotation of at least one disc rotor supported adjacent pole faces formed on the ends of the stator magnets in a plane at right angles to the axis of rotation of the rotor and includes a rotating-field winding on said stator having different coils disposed in different positions along the length of the projections or teeth. When there is a rotor at one end only of the ring of magnets, the ends of the magnets remote from the rotor are joined to a cylindrical or annular core or yoke for completing their magnetic circuits.

For some purposes it is advantageous to provide two rings of stator magnet teeth or projections supported coaxially end-to-end and co-operating with a rotor supported in a gap between the ends of the two rings. One advantage of this construction is that the magnetic attractive forces acting on the rotor are substantially balanced so that the rotor shaft is not subjected to an end thrust.

The invention and its subsidiary features will be fully understood from the following more detailed description by way of example of a submersible motor forming part of a force-pump, reference being made to the accompanying drawings, in which:

Figure 1 is a diagrammatic sectional view of the motor taken on a plane at right angles to the rotor axis and coinciding with the pole faces of the stator magnets.

Figure 2 is an axial sectional view of the motor and pump.

Figure 3 is a view corresponding to Figure 2 of a modified construction embodying two rings of stator magnet teeth or projections as operating with a single rotor supported between them.

Figure 4 is a section taken on the line IV—IV of Figure 3, and

Figure 5 is a section taken on the line V—V of Figure 3.

Referring first to Figures 1 and 2 of the drawings, the motor shown in these figures has a stator magnet system composed of twelve laminated magnet teeth or projections 1, only three of which are shown in Figure 1, the positions of the others being indicated by centre lines. The magnet teeth or projections 1 are supported in an annular pocket formed in a casing member 2, the annular pocket being formed between the outer wall of the casing 2 and an inner concentric wall 2a which surrounds a conduit 3 communicating with a delivery pipe 4. The annular pocket also contains a laminated annular core or yoke 5 to which all the magnet teeth 1 are joined at one end, and a stator winding consisting of coils 6. The annular pocket is closed by a water-tight diaphragm 7 which covers the pole faces formed on the magnets 1 at the ends thereof remote from the yoke 5.

The rotor 8 consists of a solid high-permeability iron disc carrying radial copper bars 9 joined to an outer copper ring 10 and an inner copper ring 10a to form a squirrel-cage rotor. The inner ring 10a forms a hub by which the rotor is fixed to a shaft 11 supported by a journal bearing 12 and a ball thrust bearing 13. The shaft 11 carries an impeller 14 designed to suck water through a filter 15 into the pump inlet 16 and to deliver the water under pressure through pump outlet passages 17, from which the water is delivered through passages 18 in the hub 10a and thence through the conduit 3 to the delivery pipe 4.

It will be observed that the bearing 12 is disposed between the rotor 8 and the impeller 14 and is closely surrounded by the passages 17. The journal bearing 12 is thus water-cooled and it will be seen that any wear which the bearing may suffer after long periods of duty will not seriously affect the clearance between the diaphragm 7 and the rotor 8.

As shown in the drawings, the laminations of the magnets 1 are disposed parallel to a plane radial to the axis of the motor.

The stator windings 6, 6a may be former-wound and interlinked with the magnet teeth 1. Coils belonging to different phases are disposed in different positions along the length of the magnet teeth as shown in Figure 2 to allow more room and to simplify the construction of the winding.

The diaphragm 7 may be a thin flat sheet of high tensile, high resistivity metal or other material. Alternatively it could be made of ferro-magnetic material suitably laminated.

The thrust bearing 13 may be a stainless ball-bearing or it may be lubricated with grease and protected from water ingress by a revolving seal 19. It will be observed that this bearing is entirely enclosed at one end by the end wall of the casing that forms the filter 15.

The pump shown in the drawing is a single-stage pump, but any number of stages may be used.

Figures 3 and 4 of the accompanying drawings show a modified construction embodying a motor having a double stator co-operating with a single rotor which drives a two-stage impeller. Corresponding parts are marked with the same reference numerals in Figures 1, 2, 3 and 4.

In the construction shown in Figures 3 and 4, the stator has two rings of stator magnet teeth 1 mounted coaxially end to end and each having windings 6 and 6a for generating a rotating field, there being a single rotor 8 mounted in an axial gap provided for it between the two rings of stator magnet teeth 1.

The rotor 8, which may be made of solid high-permeability iron or of a roll of laminations, carries radial conductors 9 on both faces, the conductors 9 being connected at their inner and outer ends to copper rings, thus forming flat squirrel-cage windings. The passages 18 provided in the hub 10a for the water to go through may be shaped like turbine blades to impart a small additional pressure to the water.

The individual stator magnet teeth 1 of the two rings shown in Figure 3 are axially aligned and wound correspondingly so that the magnetic lines of force indicated by the arrows 20 in Figure 3 pass axially through the rotor from the magnets 1 of one stator ring to the magnets 1 of the other stator ring. The rotor may therefore be made as thin as is mechanically possible and the rotor bars 9 may be joined together. It will be seen that the two magnetic pulls acting across the two air gaps between the rotor 8 and the two rings of stator magnets 1 oppose one another thus releasing the bearing 13 from any magnetic thrust.

The motor shown in Figures 3, 4 and 5 has a main winding (Figure 5) composed of concentric coils 61 and 62 laid in the same plane and an auxiliary winding or starting winding (Figure 4) set at an electrical angle of 90° to the main winding and composed of coils 61a and 62a which are placed directly adjacent the main winding but in a different position along the length of the magnet teeth 1. The different phases are thus placed side by side. The purpose of this arrangement is first to reduce the mean length of the coils, which as can be seen from the drawing, are tightly wired in the stator slots, and second to reduce as much as possible the dimension of the casing 2 in which the windings are enclosed. The placing of the coils 61 and 62 (and also the coils 61a and 62a) one within the other as shown also contributes to the compactness of the winding and especially to the desired reduction in the size of the casing 2 necessary to accommodate the windings. The windings shown in Figures 4 and 5 are two-pole windings but it will be evident that multipole windings can be constructed on the same principle. It will also be understood that the method of construction described is not limited to two phases; a three phase motor could evidently be constructed with three phase windings laid side by side in different positions along the length of the magnets 1 and set at an electrical angle of 120° to one another.

I claim:

An electric induction motor and pump assembly, comprising a casing having a cylindrical outer wall and an end wall; a fluid delivery conduit extending through said end wall coaxially with said casing and projecting inwardly of said casing to thereby define an annular pocket between said conduit and outer wall, a stator having a plurality of laminated stator teeth arranged in a ring to said pocket with their axes parallel to the axis of said casing, said teeth being provided with pole faces; a rotor located adjacent said pole faces; a rotary impeller coaxial with said rotor; a wall supported within said casing between said rotor and impeller, a rotatable shaft carrying said rotor and impeller and extending through said wall; a journal bearing carried by said wall and supporting said shaft at a point between said rotor and impeller, there being pump fluid outlet passages through said wall around said bearing, and said rotor also being formed with passages allowing communication of said pump fluid outlet passages with said fluid delivery conduit through said rotor; and a water-tight annular diaphragm interposed between said stator magnets and said rotor, said diaphragm being effective for closing said annular pocket against ingress of water.

References Cited in the file of this patent

UNITED STATES PATENTS

| | | |
|---|---|---|
| 323,975 | Thomson | Aug. 11, 1885 |
| 427,978 | Dobrowolsky | May 13, 1890 |
| 570,914 | Dorman | Nov. 10, 1896 |
| 1,363,315 | Dron | Dec. 28, 1920 |
| 1,539,195 | Kremser | May 26, 1925 |
| 1,605,796 | Tanzler | Nov. 2, 1926 |
| 1,894,724 | Apple | Jan. 17, 1933 |
| 2,155,514 | Tolson et al. | Apr. 25, 1939 |
| 2,469,808 | Aske | May 10, 1949 |
| 2,541,906 | Anderson | Feb. 13, 1951 |
| 2,635,547 | Cataldo | Apr. 21, 1953 |
| 2,644,635 | Warrick et al. | July 7, 1953 |
| 2,683,232 | Weissheimer | July 6, 1954 |

FOREIGN PATENTS

| | | |
|---|---|---|
| 237,074 | Switzerland | Sept. 1, 1948 |
| 430,486 | Italy | Feb. 16, 1948 |
| 582,036 | Great Britain | Nov. 1, 1946 |